United States Patent Office 3,487,761
Patented Jan. 6, 1970

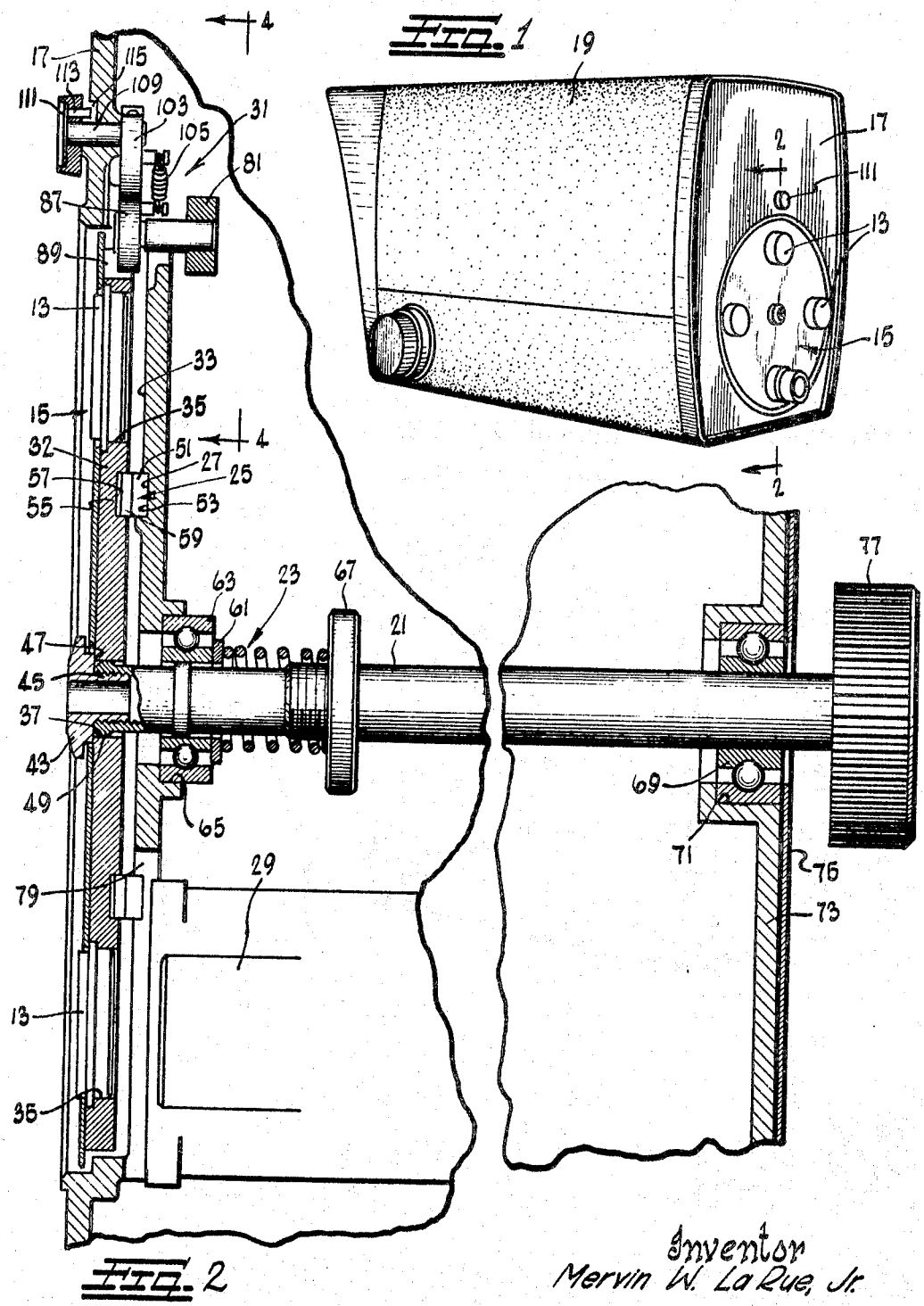

3,487,761
CAMERA LENS TURRET
Mervin W. LaRue, Jr., Barrington, Ill., assignor to Ampex Corporation, Redwood City, Calif., a corporation of California
Filed Dec. 12, 1967, Ser. No. 689,867
Int. Cl. G03b 3/00
U.S. Cl. 95—44
9 Claims

ABSTRACT OF THE DISCLOSURE

A lens carrying turret for use in a television or film camera in which the turrent positions, each of a plurality of lenses, are previsely aligned relative to a camera tube or film. The turret is disposed in a front wall of the camera and is keyed to a positioning shaft in such a way as to permit the turret to wobble with respect to the shaft. The shaft is mounted in the camera so as to permit both rotation and axial movement. Further, the shaft is biased rearwardly by a spring such that the turret is biased against a bearing disposed intermediate the turret and a reference surface on the camera. In order to locate and hold the turret in a particular precise angular position about the shaft, a detent mechanism is provided near the outer periphery of the turret.

---

This invention relates to a camera and more particularly to a turret in such a camera which positions each of a plurality of lenses carried on the turret in a precisely aligned position relative to a television camera tube or film.

In a film or television camera, lenses are commonly carried by a turret so that one may quickly and easily switch from one lens to another lens. To assure the accuracy of alignment necessary for good focus and a high quality picture, the turret should be constructed so that the optical axis of each lens is accurately aligned with the optical axis of a camera and each lens, when in position, is disposed at a predetermined and fixed distance from an objective lens in the camera or from the photosensitive surface of the camera tube when the latter is in its position for infinite focus. To assure that each lens is located at the same distance from the infinity focus position of the camera, it is necessary that the lens turret rotate in a precise plane. Also, to insure that there is a parallelism between the respective optical axes of the camera and the lenses, this plane must be previsely perpendicular to the axis of the camera. As each lens swings into an operative position before camera tube or film, the turret should be stopped and held at a relatively precise angular position so that the respective optical axes of the lens and camera will be substantialy coincident.

The present invention is particularly applicable for use in a television camera which employs, for example, a vidicon camera tube. Such a tube may require relatively large lenses which, because of their size, require a relatively large mounting radius and hence a large diameter turret. The large diameter turret together with the weight of the lenses has created problems in the mounting of the turret. The lens turret should be mounted so that it is easy to turn between various positions, but an easy turning movement of a turret is usually accompanied by poor location of the lenses. Thus, there are apparently mutually conflecting requirements, namely, accurate positioning of the lens and an easy turning of the lens turret.

Accordingly, a general object of the invention is to provide an accurate lens positioning turret for a television or film camera.

A further object of the invention is to provide a simple and precise turret mounting and positioning mechanism which is operated with minimal force, yet which is precise in its positioning of lenses.

Other objects and advantages of the invention will become apparent from the detailed description taken in connection with the accompanying drawings in which:

FIGURE 1 is a perspective view of a television camera provided with a lens turret in accordance with the present invention;

FIGURE 2 is a fragmentary, enlarged sectional view taken substantially along the line 2—2 of FIGURE 1;

Figure 3:
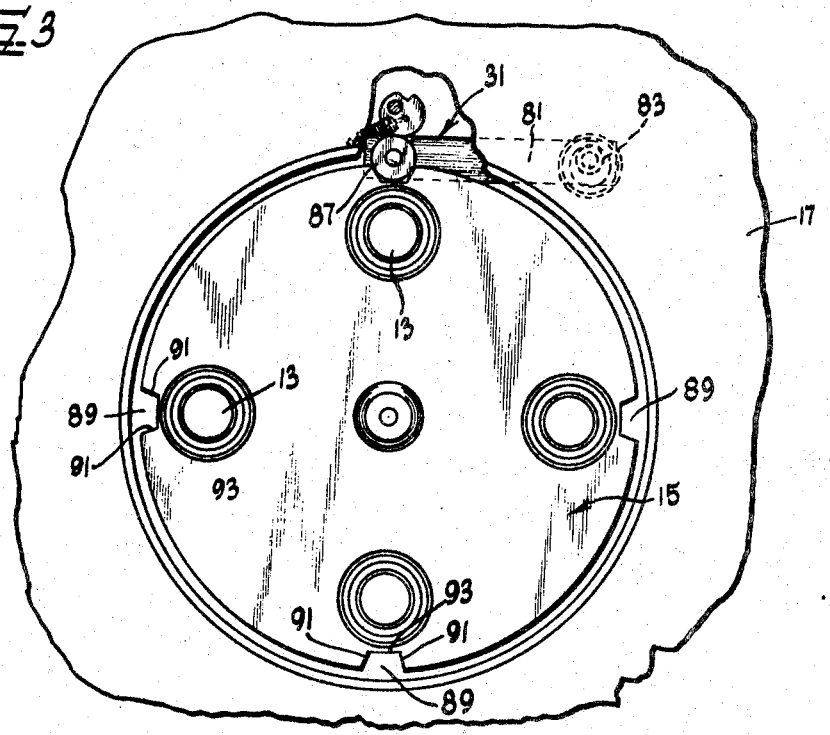
FIGURE 3 is a front view of the lens turret.

As illustrated in the drawings, the invention is, very generally, embodied in a television camera having four lenses 13 mounted on a rotatable lens turret 15 disposed at a front wall 17 of a housing 19 for the camera. The turret 15 is keyed to a positioning shaft 21 (FIGURE 2) in such a way as to permit the turret to wobble with respect to the shaft 21. The shaft 21 is mounted to the housing 19 so as to permit both rotation and axial movement thereof. The shaft 21 is biased rearward by a biasing means 23, thereby biasing the turret against a bearing means 25 disposed intermediate the turret and a reference surface 27 on the front wall 17. Rotation of the shaft 21 causes one lens to swing from alignment with a camera tube 29 (FIGURE 2) disposed for axial movement behind the turret and beneath the turning axis of the turret, and any one of the other lenses 13 to swing into alignment with the camera tube 29. A detent mechanism 31 (FIGURE 3) limits angular rotation of the turret 15 to the precise angular position.

Proceeding now to a detailed description of the invention, the illustrated camera includes four lenses 13 and these are carried by the lens turret 15 which includes a circular plate 32 disposed within a generally circular recess 33 in the front wall 17 of the housing 19 for the camera. The illustrated turret plate 32 is provided with four lens receiving openings 35 each precisely located at the same radial distance from a central opening 37 at the axis of the turret plate 32 and at 90° from its adjacent lens. The lenses 13 are respectively mounted in the openings 35 with their optical axes perpendicular to the outer and inner faces of the turret plate 32.

The turret plate 32 is supported for rotation on the forward end of the horizontally extending positioning or support shaft 21 which is mounted in the camera housing 19, for rotation and for axial movement relative thereto, as hereinafter described. The shaft 21 has its forward end projecting into the central opening 37 in the turret plate 32. The forward end of the support shaft 21 is provided with means (not shown) to key the turret plate 32 to the shaft 21 so that they rotate together. Rearward movement of the support shaft 21 with respect to the turret plate 32 is limited by a screw 43 (FIGURE 2) which is threaded into an internally threaded recess 45 in the forward end of the support shaft 21 until its radially extending shoulder 47 abuts against the end of the shaft 21. The shoulder 47 is larger in diameter than the opening 37 and hence the rearward biasing of the support shaft 21 causes the shoulder to abut against the outer face of the turret plate 32. Alternately, an external thread may be provided on the end of the shaft 21 and a nut may be substituted for the screw 43.

As shown in FIGURE 2, the front end of the support shaft 21 is provided with an annular integral collar 49 which is larger in diameter than an adjacent rearwardly extending portion of the shaft 21. The annular collar 49 is sized to fit in the central plate opening 37 so that the turret plate 32 may slide axially on the collar. Also, the collar 49 extends rearwardly in the axial direction for distance less than the thickness of the turret plate 32 so that the turret plate may wobble slightly with respect to the support shaft 21.

This mounting of the turret plate 32 for movement axially of the support shaft 21 and for wobbling movement on the shaft 21 allows a biasing of the turret plate 32 into a position where it will be in a plane normal to the optical axis of the camera tube 29, while at the same time permitting easy turning movement of the turret plate 32. More specifically, rearward biasing of the shaft 21 in turn biases the turret plate 32 rearward against the bearing means 25 which is a thrust bearing formed in an annulus and having one race 51 disposed in an annular groove 53 in an outer face of the front housing wall 17 which defines the reference surface 27. Another race 55 is disposed in an annular groove 57 in the inner face of the turret plate 32. Needle shaped bearing elements 59 are disposed between the races 51 and 55 to roll as the turret plate 32 is rotated. The vertical or bottom walls of the grooves 53 and 57 are accurately machined so as to serve as reference surfaces for the positioning of the turret plate 32.

In the illustrated embodiment, the support shaft 21 is biased rearward by the biasing means 23 which is in the form of a coiled compression spring encircling the support shaft 21. One end of the spring 23 abuts a washer 61 which is disposed on the shaft 21 and bears against the inner race of an annular ball bearing 63 which journals the front end of the shaft 21. The outer race of the ball bearing 63 is received in a retaining socket 65 in the rear face of the front wall 17. The other end of the compression spring 23 abuts a nut 67 threaded on the support shaft 21 and acts through the nut 67 to urge the shaft 21 to the right as seen in FIGURE 2. The nut 67 may be turned to move longitudinally on the shaft to adjust the spring pressure and thus the thrust loading on the bearing means 25. Also, the spring 23 acts on the front shaft bearing 63 to take up any slack therein. More specifically, the washer 61 bearing against the inner bearing race causes the balls in the front bearing 63 to be urged outward against the outer race. Thus, the axis of rotation of the shaft 21 is accurately located and will not shift due to any looseness or play in the bearing 63.

The rear end of the support shaft 21 is journaled in an annular ball bearing 69 disposed in annular recess 71 in a rear housing wall 73. The ball bearing 69 is retained in the recess by a plate 75 suitably attached to the rear wall 73.

An operating knob or handle 77 is attached to the rear end of the shaft 21 and is disposed exteriorly of the rear housing wall 73 for manipulation by the operator. Thus, turning of the operator knob 77 turns the shaft 21 and the turret plate 32 to rotate the turret plate and locate each lens 13 in front of the camera tube 29. The illustrated camera tube 29 is a vidicon tube mounted by suitable means (not shown) for axial movement behind a circular opening 79 in the front housing wall 17. The axis of the vidicon tube is disposed directly below the shaft 21 at a distance equal to the radius of the center of lenses 13.

Each lens is located angularly in alignment with the optical axis of the camera tube 29 by the detent mechanism 31. Generally, the detent mechanism includes a detent lever 81 which is pivotally mounted at one end on a pivot pin 83 and which is biased by a spring 85 to move a detent roller 87, rotatably mounted on its other end, into engagement with the peripheral wall of the turret plate 32. Consequently, the detent roller 87 is biased to move into one of four detent notches 89 formed in the perimeter wall of the turret plate 32 opposite each lens. To assure a centering of the turret plate, the detent notches 89 are shaped with inwardly converging sloped side walls 91 which will engage opposite sides of the roller 87 as it enters therein. The diameter of the roller 87 is considerably larger than the notch 89 at its bottom wall 93 so that the roller 87 never fully settles in the notch 89 even with wear of the roller or with wear of the inclined converging notch walls 91.

The detenting spring 85 has sufficient strength to force the detent roller 87 toward the bottom wall 93 of the notch 89 and turn the turret plate 32 until both of the sloped walls 91 equally engage and center the detent roller between them. Because the turret plate 32 and support shaft 21 are easily turned on their respective bearings, the spring 85 need not be of unusually great strength to cause this centering action. The sloped walls 91, free turning roller 87 and light detenting spring force provide only a minimal frictional drag on the turning of the turret plate 32 as the operator manipulates the operating knob 77.

Figure 4:
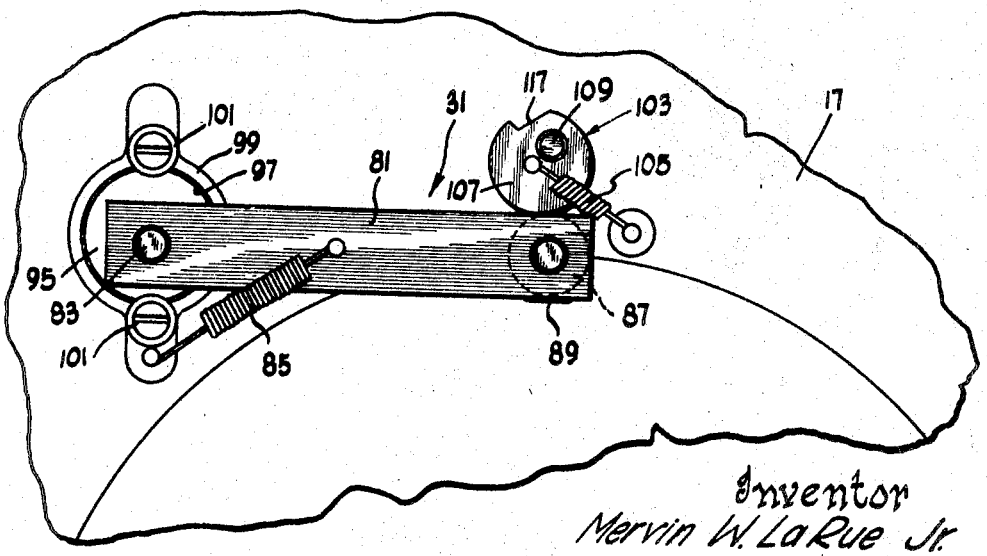
FIGURE 4 is a view taken along the line 4—4 of FIGURE 2.

To assure accurate angular alignment of the optical axes of the lens 13 and the vidicon tube 29, the detent mechanism 31 is provided with a very fine adjustment means in the form of a bushing or bearing mount 95 which eccentrically mounts the pivot pin 83 for the detent lever 81 for an adjusting movement. As best seen in FIGURE 4, the pivot pin 83 is fastened to the cylindrically shaped bushing 95 at a location offset from the center of the bushing, that is, the pin 83 is eccentric to the axis of the bushing 95. The pivot pin 83 is disposed beneath the bushing axis and a turning of the bushing 95 moves the pivot pin to the left or right as viewed in FIGURE 4 to shift the detent roller 87 to an adjusted position. The bushing 95 is received in a cylindrical recess 97 formed by a generally annular rib 99 in the rear surface of the front housing wall 17. A pair of locking screws 101 are threaded into a pair of enlargements of the rib 99 and have washers extending over the bushing 95. The screws 101 are tightened to lock the bushing 95 against turning in the recess 97. From the foregoing, it will be seen that turning of the bushing 95 will shift the detent roller 87 to an adjusted position and the locking screws 101 are tightened to maintain the detent roller 87 in its adjusted position.

To lock the lens turret 15 against turning with manipulation of the knob 77, there is provided a simple locking means in the form of a cam 103 which is biased by a spring 105 (FIGURE 4) to a locking position in which a large lobe 107 on the cam 103 engages the upper peripheral edge of the detent roller 87, as best seen in FIGURES 3 and 4. The locking cam 103 is pivotally mounted on a pin 109 disposed in a bore disposed above the axis of the detent roller 87.

To turn the locking cam 103 between its locking position and an unlocked position (i.e., a position in which the cam 103 is disposed with its large lobe 107 turned above the shaft 109), an operating knob 111 (FIGURES 1 and 2) is fixed to the cam pivot pin 109 and is disposed on the exterior of the front housing wall 17 above the turret 15. A stop finger 113 (FIGURE 2) is fixed to the knob 111 and extends rearwardly into an arcuately shaped notch 115 in the front housing wall 17 and abuts against an end wall of the notch 115 to limit turning of the locking cam 103 by the spring 105 in the counterclockwise (unlocking) direction as viewed in FIGURE 3.

In operating the camera, the operator turns the operating knob 77 to turn the turret support shaft 21 and turret plate 32 on the forward end of the shaft. The support shaft 21 turns with little frictional resistance in the bearings 63 and 69 and the turret plate turns with little frictional resistance between the races 51 and 55 and the needle bearing elements 59. The compression spring 23 acts through the support shaft 21 to urge the turret plate 32 toward the front wall to take up any slack in the needle bearing 25 and thereby assure accurate positioning of the turret plate 32.

The operator may release the operating knob 77 when he feels the detent roller 87 roll into a detent notch 89 and exert a retarding force on further turning of the knob 77. If the operator desires, he may, by exerting sufficient force on the knob 77, turn the turret 15 through the first encountered detent notch 89 to any succeeding notch without stopping the turning of the turret plate 32. On the other hand, the operator may lock the turret plate 32 in any given position merely by turning the knob 111 on the front of the camera to swing the detent spring 105 over a dead center position whereby the spring urges locking cam lob 107 into engagement with the upper surface of the detent roller 87. If an angular adjustment is needed, the eccentric bushing 95 is turned to shift the pivot axis of the detent lever 81 and thereby the axis of the detent roller 87.

From the foregoing, it will be appreciated that the invention provides a turret lens mounting which is simple of low cost and quite accurate. Also, the lens mounting may be finely adjusted to assure accuracy of focus and a high quality picture.

While a preferred embodiment has been shown and described it will be understood that there is no intent to limit the invention by such disclosure but, rather, it is intended to cover all modifications and alternate constructions falling within the spirit and scope of the invention as defined in the appended claims.

What is claimed is:

1. In a camera, a housing having a reference surface, a turret plate rotatable about a predetermined axis extending perpendicularly to said reference surface, said turrent plate having a plurality of lens receiving openings disposed thereon at angularly spaced locations, a shaft journaled for rotation and for axial movement in said frame at said axis, means connecting said turret plate to said shaft for turning movement, said connecting means permitting wobbling and limited axial movement of said turret plate relative to said shaft, bearing means disposed between said reference surface and said turret plate, and means biasing said shaft so that said turret plate bears against said bearing means whereby said turret plate is maintained in a predetermined plane.

2. Apparatus in accordance with claim 1 which further includes a manual operating means connected to said shaft to rotate the same and in which said biasing means is a compression spring encircling said shaft and biasing said shaft longitudinally.

3. Apparatus in accordance with claim 1 which further includes means for detenting said turret plate in each of a plurality of angularly spaced positions whereby each lens opening may be held in angular alignment with an optical axis of said camera.

4. Apparatus in accordance with claim 3 in which said turret plate is circular having angularly spaced notches located at positions corresponding to the angular spacing of said lens openings, and in which said detent means includes a detent roller biased into engagement with the periphery of said plate and for movement into said notches to hold said plate in each of said positions.

5. Apparatus in accordance with claim 4 in which said detent means includes a detent lever pivoted at one end and carrying said detent roller at its other end, and an eccentric bearing mount pivotally mounting said lever for adjusting movement to accurately locate said detent roller relative to said optical axis.

6. Apparatus in accordance with claim 4 which further includes means for locking said detent means against movement of the detent roller from the respective notches whereby said turret plate is located in a predetermined position.

7. Apparatus in accordance with claim 6 in which said locking means includes a cam rotatable in one direction to engage and hold said detent roller against release movement and rotatable in an opposite direction to be spaced from said detent roller and a spring biasing said cam to engage and hold said cam in either its locking or its non-locking position.

8. In a television or film camera having a housing including a front support wall and a back support wall, a turret plate carrying a plurality of lenses angularly spaced from one another and disposed equidistant from an axis of rotation of said turret plate, a support shaft spanning said front and rear support walls with its axis coincident with said turret axis and having its front end extending through an opening in said turret plate, means for keying the front end of said shaft to said turret plate for turning movement of said turret plate and axial movement of said shaft, a collar on said shaft within said turret plate opening having a width less than the thickness of said turret plate, a stop on the front end of said shaft for preventing movement of said turret plate beyond the front end of said shaft, bearing means journaling said shaft in said housing for rotative and axial movement, means fixed to the other end of said shaft for facilitating manual turning of said shaft, a thrust bearing disposed between said front wall and said turret plate, and a spring biasing said shaft toward said rear wall thereby holding said turret plate in a predetermined plane.

9. The camera of claim 8 in which said shaft bearing means is in a ball bearing with balls disposed between inner and outer races and in which said spring biases one of said races against said balls and the latter against the other race and thereby holds the center of rotation of said shaft at an accurately located position.

References Cited

UNITED STATES PATENTS 2,832,274   4/1958   Lorenz _____ 95—44 XR

NORTON ANSHER, Primary Examiner

RICHARD L. MOSES, Assistant Examiner

U.S. Cl. X.R.

252—131, 141; 353—101